United States Patent
Ahn

(10) Patent No.: US 9,046,447 B2
(45) Date of Patent: Jun. 2, 2015

(54) CRANK ANGLE DETECTION APPARATUS

(71) Applicant: Hyundai Motor Company, Seoul (KR)

(72) Inventor: Younghun Ahn, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/081,704

(22) Filed: Nov. 15, 2013

(65) Prior Publication Data

US 2014/0182365 A1    Jul. 3, 2014

(30) Foreign Application Priority Data

Dec. 27, 2012 (KR) .................. 10-2012-0155368

(51) Int. Cl.
G01M 15/06 (2006.01)
G01M 15/04 (2006.01)

(52) U.S. Cl.
CPC ............. *G01M 15/06* (2013.01); *G01M 15/046* (2013.01)

(58) Field of Classification Search
CPC ........................... G01M 15/06; G01M 15/046
USPC ..................................................... 73/114.26
See application file for complete search history.

(56) References Cited

U.S. PATENT DOCUMENTS

| | | | | | |
|---|---|---|---|---|---|
| 4,417,469 | A | * | 11/1983 | Stevenson et al. | 73/114.25 |
| 4,825,691 | A | * | 5/1989 | Sekiguchi | 73/114.26 |
| 5,462,022 | A | * | 10/1995 | Ushida | 123/90.17 |
| 6,286,365 | B1 | * | 9/2001 | Lang et al. | 73/114.26 |
| 6,868,815 | B2 | * | 3/2005 | Carden | 123/192.2 |
| 7,201,124 | B2 | * | 4/2007 | Neubauer et al. | 123/90.17 |
| 7,254,991 | B2 | * | 8/2007 | Stork et al. | 73/114.26 |
| 7,357,114 | B2 | * | 4/2008 | Taki | 123/198 E |
| 8,302,466 | B2 | * | 11/2012 | Shimizu | 73/114.27 |
| 8,720,292 | B2 | * | 5/2014 | Fujimoto et al. | 74/337.5 |
| 2006/0042074 | A1 | * | 3/2006 | Stork et al. | 29/622 |
| 2009/0165545 | A1 | * | 7/2009 | Fujimoto et al. | 73/115.02 |
| 2009/0183701 | A1 | * | 7/2009 | Nguyen et al. | 123/90.15 |

FOREIGN PATENT DOCUMENTS

JP        2012-136996 A      7/2012

* cited by examiner

*Primary Examiner* — Freddie Kirkland, III
(74) *Attorney, Agent, or Firm* — Morgan, Lewis & Bockius LLP

(57) ABSTRACT

A crank angle detection apparatus may include a crank gear provided to be rotated together with a crankshaft, a balance gear provided to be rotated together with a balance shaft and engaged with the crank gear so that the balance shaft is rotated in accordance with rotation of the crankshaft, and a crank angle sensor configured to sense rotation of the balance gear or the crank gear and detect a rotation angle of the crankshaft.

10 Claims, 3 Drawing Sheets

CRANK ANGLE DETECTION APPARATUS

CROSS-REFERENCE TO RELATED APPLICATION

The present application claims priority of Korean Patent Application Number 10-2012-0155368 filed Dec. 27, 2012, the entire contents of which application are incorporated herein for all purposes by this reference.

BACKGROUND OF INVENTION

1. Field of Invention

The present invention relates to a crank angle detection apparatus, and more particularly, to a crank angle detection apparatus in which a separate target wheel for detecting a crank angle is omitted.

2. Description of Related Art

In general, a crank angle sensor refers to a sensor which detects a rotation angle or a rotation position of a crankshaft of an engine.

The rotation angle (crank angle) of the crankshaft is an important parameter that determines ignition timing of the engine. For detecting a crank angle using the crank angle sensor, there are a method of directly detecting a rotation angle of the crankshaft and a method of estimating the crank angle from a rotation position of a distributor. Here, the distributor is a device for distributing high voltages generated in an ignition coil to spark plugs in order of ignition.

A method of detecting a signal from the distributor connected to an electric system is simple, but precision thereof is low. Therefore, a method of directly detecting a crank angle is mainly used in recent years.

However, if a separate target wheel, which is subject to detection by the crank angle sensor, is mounted at the crankshaft to directly detect the crank angle, a size and a weight of an engine may be increased. In addition, as processes of manufacturing the target wheel and mounting the target wheel at the crankshaft are added, the number of production processes for the engine may be increased. Moreover, components for mounting the target wheel at the crankshaft are required. Therefore, production costs for the engine may be ultimately increased.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a crank angle detection apparatus in which an additional constituent element for detecting a crank angle is not required.

In addition, the present invention has been made in an effort to provide a crank angle detection apparatus having advantages of reducing a size and a weight of an engine, simplifying a production process, and reducing production costs.

Various aspects of the present invention provide a crank angle detection apparatus including a crank gear provided to be rotated together with a crankshaft, a balance gear provided to be rotated together with a balance shaft and engaged with the crank gear so that the balance shaft is rotated in accordance with a rotation of the crankshaft, and a crank angle sensor configured to sense a rotation of the balance gear and detect a rotation angle of the crankshaft.

The crank gear may include a protrusion that protrudes from an outer circumference of the crank gear, and the balance gear may include a groove that is concavely recessed from an outer circumference of the balance gear, wherein the protrusion and the groove are disposed to be engaged with each other in accordance with the rotations of the crank gear and the balance gear.

The crank angle sensor may be disposed to detect a position of the groove, may sense a position of the balance gear in accordance with the position of the groove, and may detect a rotation angle of the crankshaft.

The crank angle sensor may be disposed to monitor a position where the protrusion and the groove are engaged with each other, may sense the rotation of the balance gear in accordance with a period when the protrusion and the groove are engaged with each other, and may detect a rotation angle of the crankshaft.

A ratio of the number of protrusions to the number of grooves may be the same as a gear ratio of the crank gear to the balance gear. The protrusion and the groove may have shapes corresponding to each other.

Various other aspects of the present invention provide a crank angle detection apparatus including a crank gear provided to be rotated together with a crankshaft, a balance gear provided to be rotated together with a balance shaft and engaged with the crank gear so that the balance shaft is rotated in accordance with a rotation of the crankshaft, and a crank angle sensor configured to sense a rotation of the crank gear and detect a rotation angle of the crankshaft.

The crank gear may include a groove that is concavely recessed from an outer circumference of the crank gear, and the balance gear may include a protrusion that protrudes from an outer circumference of the balance gear, wherein the groove and the protrusion are disposed to be engaged with each other in accordance with the rotations of the crank gear and the balance gear.

The crank angle sensor may be disposed to detect a position of the groove, may sense a position of the crank gear in accordance with the position of the groove, and may detect a rotation angle of the crankshaft.

The crank angle sensor may be disposed to monitor a position where the groove and the protrusion are engaged with each other, may sense the rotation of the crank gear in accordance with a period when the groove and the protrusion are engaged with each other, and may detect a rotation angle of the crankshaft.

A ratio of the number of grooves to the number of protrusions may be the same as a gear ratio of the crank gear to the balance gear. The groove and the protrusion may have shapes corresponding to each other.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
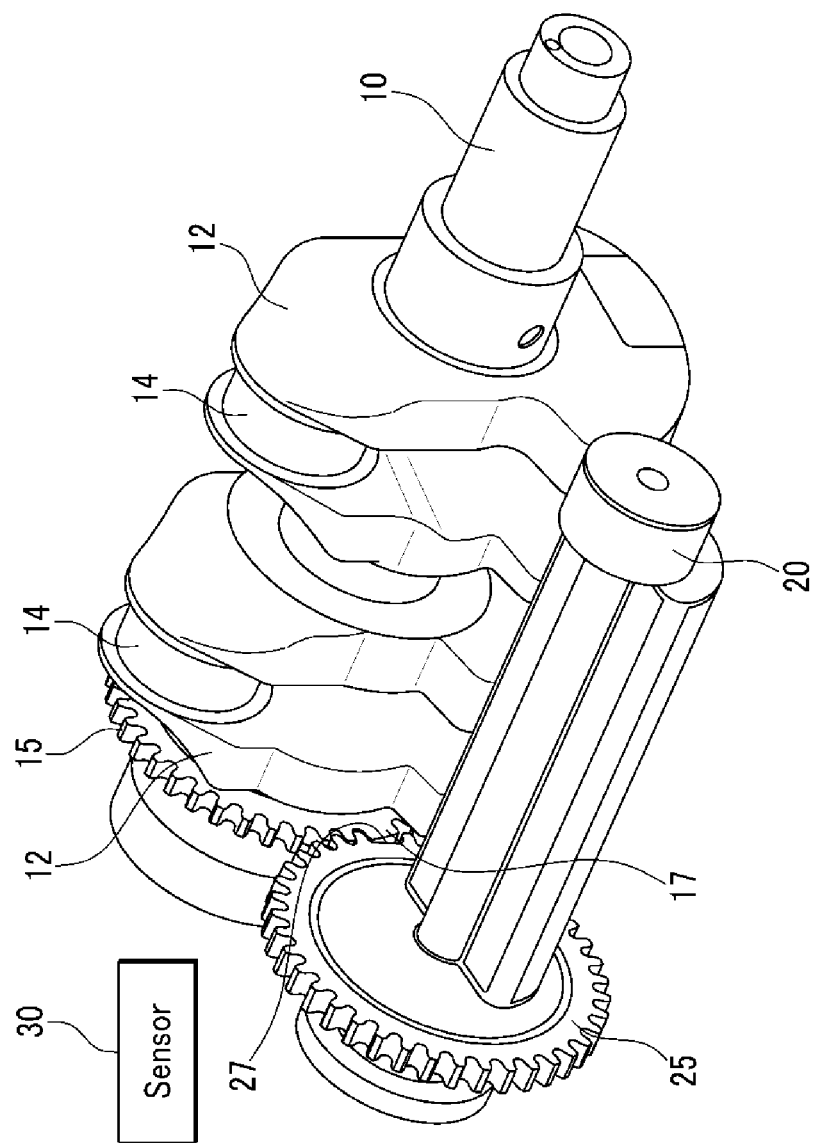
FIG. 1 illustrates an exemplary crank angle detection apparatus according to the present invention.

FIG. 1 is a configuration view of a crank angle detection apparatus according to various embodiments of the present invention. As illustrated in FIG. 1, a crank angle detection apparatus of the present invention includes a crankshaft 10, a balance shaft 20, a crank gear 15, a balance gear 25, and a crank angle sensor 30.

The crankshaft 10 refers to an apparatus which is installed in a crank case, and outputs force to the outside of an engine by receiving force of a piston, which is transmitted by an explosion stroke of each cylinder. In addition, the crankshaft 10 converts reciprocating motion of the piston into rotational motion, and outputs torque. Meanwhile, the piston reciprocates in accordance with rotational motion of the crankshaft 10 in suction, compression, and exhaust strokes of each of the cylinders. Here, the crankshaft 10 and the piston are connected to each other by a connecting rod. In addition, the crank case is integrally formed with a cylinder block, or separately formed to be coupled to the cylinder block.

The crankshaft 10 includes a balance weight 12, and a crank pin 14. The balance weight 12 is formed to adjust weight balance when the crankshaft 10 is rotated. In addition, the balance weight 12 provides additional rotational inertia for the crankshaft 10.

The crank pin 14 is rotatably connected to a connecting rod, and connects the connecting rod and the balance weight 12. That is, the crank pin 14 is coupled to a big end of the connecting rod. In addition, the balance weight 12 may be formed at both ends of the crank pin 14.

The balance shaft 20 is mounted in the engine in which the piston reciprocates. In addition, the balance shaft 20 is mounted to generate a load in a direction in which inertial force or forces, which is/are generated by reciprocating motion of the piston and rotational motion of the crankshaft 10, is/are attenuated. Moreover, one or two balance shafts 20 are used in accordance with the number or arrangement of cylinders of the engine, and are rotated in the same direction as or a reverse direction to the crankshaft at a speed, for example, equal to or two times of a speed of the crankshaft.

The configurations and the operations of the crankshaft 10 and the balance shaft 20 are known in the art, and therefore a more detailed description will be omitted.

The crank gear 15 refers to a gear provided at the crankshaft 10 so that the crankshaft 10 and the balance shaft 20 are engaged with each other. In addition, the crank gear 15 is rotated together with the crankshaft 10. Moreover, the crank gear 15 is formed in a circular shape like a general gear, and gear teeth are formed on an outer circumference of the crank gear 15.

The balance gear 25 refers to a gear provided at the balance shaft 20 so that the crankshaft 10 and the balance shaft 20 are engaged with each other. In addition, the balance gear 25 is rotated together with the balance shaft 20. Moreover, the balance gear 25 is formed in a circular shape like a general gear, and gear teeth are formed on an outer circumference of the balance gear 25.

The gear teeth of the crank gear 15 and the gear teeth of the balance gear 25 are engaged with each other. That is, because the balance gear 25 and the crank gear 15 are engaged with each other, the balance shaft 20 is rotated in accordance with the rotation of the crankshaft 10.

Meanwhile, in a two-cylinder engine, a general gear ratio of the crank gear 15 to the balance gear 25 is 1:1. In addition, in a four-cylinder engine, a general gear ratio of the crank gear 15 to the balance gear 25 is 2:1.

Figure 2:
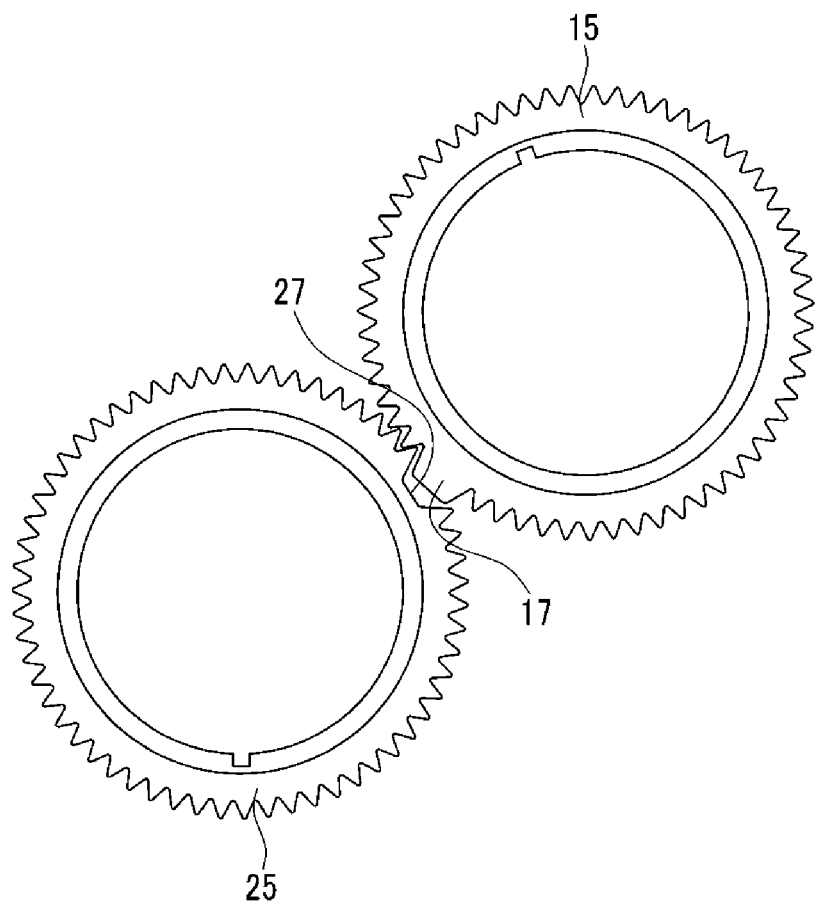
FIG. 2 illustrates an exemplary crank gear and balance gear according to the present invention.
Figure 3:
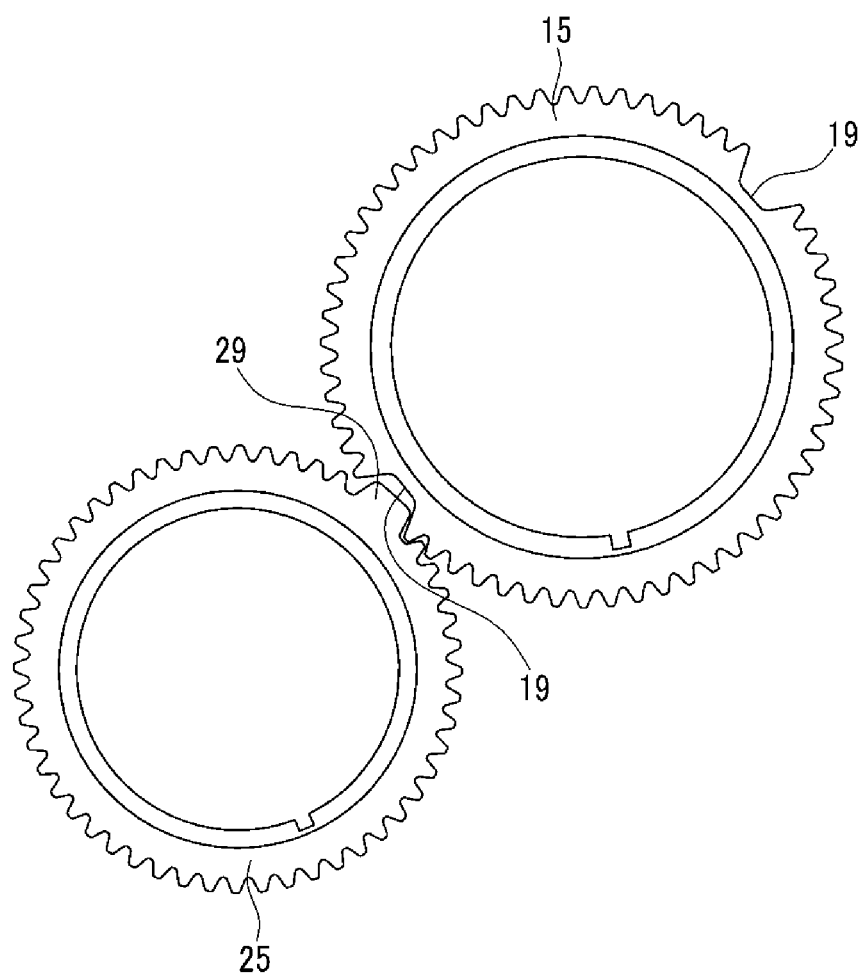
FIG. 3 illustrates another exemplary crank gear and balance gear according to the present invention.

While FIGS. 1 to 3 illustrate a state in which the crank gear 15 and the balance gear 25 are directly engaged with each other, the crank gear 15 and the balance gear 25 may be connected by an additional gear to be rotated in the same direction as or a reverse direction to each other. This connection between the crank gear 15 and the balance gear 25 may be readily changed and applied, and is within the spirit and scope of the present invention.

The crank angle sensor 30 refers to a sensor which detects a rotation angle of the crankshaft 10. In addition, the crank gear 15 or the balance gear 25 is subject to detection by the crank angle sensor 30. That is, the crank angle sensor 30 detects the rotation angle of the crankshaft 10 by sensing rotation of the crank gear 15 or the balance gear 25. Moreover, the crank angle sensor 30 is mounted on the cylinder block. Meanwhile, the crank angle sensor 30 is disposed at a position on the cylinder block, where the crank angle sensor 30 may sense the rotation of the crank gear 15 or the balance gear 25.

FIG. 2 illustrates the crank gear and the balance gear according to various embodiments of the present invention. As an example, FIG. 2 illustrates the crank gear 15 and the balance gear 25 of a two-cylinder engine.

As illustrated in FIG. 2, the crank gear 15 and the balance gear 25 of the two-cylinder engine have a gear ratio of 1:1. In addition, the crank gear 15 includes a protrusion 17, and the balance gear 25 includes a groove 27.

The protrusion 17 is formed on an outer circumference of the crank gear 15. In addition, the protrusion 17 is a portion protruding from the outer circumference of the crank gear 15. That is, the protrusion 17 is formed at a part of the outer circumference of the crank gear 15, where the gear teeth are omitted.

The groove 27 is formed on an outer circumference of the balance gear 25. In addition, the groove 27 is a portion concavely recessed from the outer circumference of the balance gear 25. That is, the groove 27 is formed at a part of the outer circumference of the balance gear 25, where the gear teeth are omitted.

FIG. 2 illustrates a state in which a single protrusion 17 is formed at the crank gear 15, and a single groove 27 is formed in the balance gear 25. However, the present invention is not limited thereto, and the numbers and the shapes of the protrusions 17 and the grooves 27 may be readily changed and applied. In addition, a ratio of the number of protrusions 17 to the number of grooves 27 is 1:1, which is the same as the gear ratio of the crank gear 15 to the balance gear 25. Moreover, the groove 27 may be formed in the crank gear 15, and the protrusion 17 may be formed at the balance gear 25. Meanwhile, the protrusion 17 and the groove 27 have shapes corresponding to each other.

In a case in which the single protrusion 17 and the single groove 27 are formed at the crank gear 15 and the balance gear 25, respectively, the protrusion 17 and the groove 27 may be engaged with each other once for every one rotation of the crank gear 15 and the balance gear 25. The above-mentioned operation is possible because the gear ratio of the crank gear 15 to the balance gear 25 of the two-cylinder engine is formed to be 1:1. In addition, the crank gear 15 and the balance gear 25 are disposed such that the protrusion 17 and the groove 27 are engaged with each other in accordance with the rotation of the crank gear 15 and the balance gear 25.

The crank angle sensor 30 may be disposed so as to observe, monitor or detect a position where the protrusion 17 and the groove 27 are engaged with each other.

In a case in which the crank angle sensor 30 is disposed so as to observe, monitor or detect the position where the protrusion 17 and the groove 27 are engaged with each other, the crank angle sensor 30 senses rotation of the crank gear 15 or the balance gear 25 in accordance with a period when the protrusion 17 and the groove 27 are engaged with each other, and detects a rotation angle of the crankshaft 10.

The crank angle sensor 30 may be disposed so as to detect a position of the protrusion 17 or the groove 27.

In a case in which the crank angle sensor 30 is disposed so as to detect the position of the protrusion 17 or the groove 27, the crank angle sensor 30 senses a position of the crank gear 15 or the balance gear 25 in accordance with the position of the protrusion 17 or the groove 27, and detects a rotation angle of the crankshaft 10.

FIG. 3 is a view illustrating a crank gear and a balance gear according to various embodiments of the present invention. In addition, FIG. 3 illustrates the crank gear 15 and the balance gear 25 of the four-cylinder engine.

As illustrated in FIG. 3, the crank gear 15 and the balance gear 25 of the four-cylinder engine have a gear ratio of 2:1. In addition, the crank gear 15 includes grooves 19, and the balance gear 25 includes a protrusion 29.

The grooves 19 are formed on an outer circumference of the crank gear 15. In addition, the grooves 19 are portions concavely recessed from the outer circumference of the crank gear 15. That is, the grooves 19 are formed at parts of the outer circumference of the crank gear 15, where the gear teeth are omitted.

The protrusion 29 is formed on an outer circumference of the balance gear 25. In addition, the protrusion 29 is a portion protruding from the outer circumference of the balance gear 25. That is, the protrusion 29 is formed at a part of the outer circumference of the balance gear 25, where the gear teeth are omitted.

FIG. 3 illustrates a state in which the two grooves 19 are formed at the crank gear 15, and the single protrusion 29 is formed at the balance gear 25. However, the present invention is not limited thereto, two protrusions 29 may be formed at the crank gear 15, and a single groove 19 may be formed at the balance gear 25. In addition, the numbers and the shapes of the grooves 19 and the protrusions 29 may be changed and applied by the person skilled in the art. Moreover, a ratio of the number of grooves 19 or protrusions 29 formed at the crank gear 15 to the number of grooves 19 or protrusions 29 formed at the balance gear 25 is 2:1, which is the same as the gear ratio of the crank gear 15 to the balance gear 25. Meanwhile, the grooves 19 and the protrusion 29 have shapes corresponding to each other.

In a case in which two grooves 19 are formed at the crank gear 15, and one protrusion 29 is formed at the balance gear 25, the protrusion 29 may be alternately engaged with the two grooves 19 of the crank gear 15 for every one rotation of the balance gear 25. That is, the protrusion 29, which has been engaged with one of the two grooves 19, is engaged with the other of the two grooves 19 after next one rotation of the balance gear 25. The above-mentioned operation is possible because the gear ratio of the crank gear 15 and the balance gear 25 of the four-cylinder engine is formed to be 2:1, and the two grooves 19 are formed to be symmetric with respect to a rotation center of the crank gear 15. In addition, the crank gear 15 and the balance gear 25 are disposed such that the grooves 19 and the protrusion 29 are engaged with each other in accordance with the rotation of the crank gear 15 and the balance gear 25.

The crank angle sensor 30 may be disposed so as to observe, monitor or detect a position where the grooves 19 and the protrusion 29 are engaged with each other. In a case in which the crank angle sensor 30 is disposed so as to observe, monitor or detect the position where the grooves 19 and the protrusion 29 are engaged with each other, the crank angle sensor 30 senses rotation of the crank gear 15 or the balance gear 25 in accordance with a period when the grooves 19 and the protrusion 29 are engaged with each other, and detects a rotation angle of the crankshaft 10.

The crank angle sensor 30 may be disposed so as to detect a position of the grooves 19 or the protrusion 29. In a case in which the crank angle sensor 30 is disposed so as to detect the position of the grooves 19 or the protrusion 29, the crank angle sensor 30 senses a position of the crank gear 15 or the balance gear 25 in accordance with the position of the grooves 19 or the protrusion 29, and detects a rotation angle of the crankshaft 10.

According to various embodiments of the present invention described above, a separate target wheel for sensing a crank angle is omitted, the crank angle sensor 30 directly detects a crank angle using the crank gear 15 or the balance gear 25, which are required to connect the crankshaft 10 and the balance shaft 20, and as a result, a size and a weight of an engine may be reduced. In addition, a production process for the engine may be simplified. Moreover, production costs of the engine may be reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A crank angle detection apparatus comprising:
   a crank gear provided to be rotated together with a crankshaft;
   a balance gear provided to be rotated together with a balance shaft and engaged with the crank gear so that the balance shaft is rotated in accordance with a rotation of the crankshaft; and
   a crank angle sensor configured to sense a rotation of the balance gear and detect a rotation angle of the crankshaft,
   wherein the crank gear includes a protrusion that protrudes from an outer circumference of the crank gear, and the balance gear includes a groove that is concavely recessed from an outer circumference of the balance gear and has a recession area larger than that of other grooves between gear teeth of the balance gear, wherein the protrusion and the groove are disposed to be selectively engaged with each other in accordance with the rotations of the crank gear and the balance gear, and wherein the crank angle sensor detects the rotation angle of the crankshaft by detecting a position of the groove of the balance gear or the protrusion of the crank gear.

2. The crank angle detection apparatus of claim 1, wherein the crank angle sensor is disposed to detect the position of the groove, senses a position of the balance gear in accordance with the position of the groove, and detects a rotation angle of the crankshaft.

3. The crank angle detection apparatus of claim 1, wherein the crank angle sensor is disposed to monitor a position where the protrusion and the groove are engaged with each other, senses the rotation of the balance gear in accordance with a period when the protrusion and the groove are engaged with each other, and detects a rotation angle of the crankshaft.

4. The crank angle detection apparatus of claim 1, wherein a ratio of the number of protrusions to the number of grooves is the same as a gear ratio of the crank gear to the balance gear.

5. The crank angle detection apparatus of claim 1, wherein the protrusion and the groove have shapes corresponding to each other.

6. A crank angle detection apparatus comprising:
   a crank gear provided to be rotated together with a crankshaft;
   a balance gear provided to be rotated together with a balance shaft and engaged with the crank gear so that the balance shaft is rotated in accordance with a rotation of the crankshaft; and
   a crank angle sensor configured to sense a rotation of the crank gear and detect a rotation angle of the crankshaft, wherein the crank gear includes a groove that is concavely recessed from an outer circumference of the crank gear and has a recession area larger than that of other grooves between gear teeth of the crank gear, and the balance gear includes a protrusion that protrudes from an outer circumference of the balance gear, and wherein the groove and the protrusion are disposed to be selectively engaged with each other in accordance with the rotations of the crank gear and the balance gear, and wherein the crank angle sensor detects the rotation angle of the crankshaft by detecting a position of the groove of the balance gear or the protrusion of the crank gear.

7. The crank angle detection apparatus of claim 6, wherein the crank angle sensor is disposed to detect the position of the groove, senses a position of the crank gear in accordance with the position of the groove, and detects a rotation angle of the crankshaft.

8. The crank angle detection apparatus of claim 6, wherein the crank angle sensor is disposed to monitor a position where the groove and the protrusion are engaged with each other, senses the rotation of the crank gear in accordance with a period when the groove and the protrusion are engaged with each other, and detects a rotation angle of the crankshaft.

9. The crank angle detection apparatus of claim 6, wherein a ratio of the number of grooves to the number of protrusions is the same as a gear ratio of the crank gear to the balance gear.

10. The crank angle detection apparatus of claim 6, wherein the groove and the protrusion have shapes corresponding to each other.

\* \* \* \* \*